(12) United States Patent
Jeong et al.

(10) Patent No.: US 10,757,229 B2
(45) Date of Patent: Aug. 25, 2020

(54) APPARATUS AND METHOD FOR CONVERTING PROTOCOL BY TYPE OF DATA AND VEHICLE SYSTEM

(71) Applicants: HYUNDAI MOTOR COMPANY, Seoul (KR); KIA MOTORS CORPORATION, Seoul (KR)

(72) Inventors: Myeong Gyu Jeong, Seoul (KR); Dong Jin Shin, Suwon-si (KR); Chul Min Kim, Yongin-si (KR); Dong Youl Lee, Seoul (KR); Young Su Kim, Seongnam-si (KR); Jae Am Seo, Seongnam-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 216 days.

(21) Appl. No.: 15/976,249

(22) Filed: May 10, 2018

(65) Prior Publication Data
US 2019/0132424 A1    May 2, 2019

(30) Foreign Application Priority Data
Nov. 1, 2017    (KR) .................. 10-2017-0144453

(51) Int. Cl.
*H04L 29/06* (2006.01)
*H04L 12/40* (2006.01)
*H04L 29/08* (2006.01)

(52) U.S. Cl.
CPC ........ *H04L 69/08* (2013.01); *H04L 12/40006* (2013.01); *H04L 67/12* (2013.01);
(Continued)

(58) Field of Classification Search
CPC ............... H04L 12/40; H04L 2012/40215
See application file for complete search history.

(56) References Cited

U.S. PATENT DOCUMENTS 6,654,355 B1 * 11/2003 Marbach ............. H04L 12/4135
                                                   370/285
9,191,467 B2    11/2015 Triess et al.
(Continued)

FOREIGN PATENT DOCUMENTS

KR    20130114892 A    10/2013
KR    101536141 B1    7/2015

*Primary Examiner* — Hassan Kizou
*Assistant Examiner* — Hector Reyes
(74) *Attorney, Agent, or Firm* — Brinks Gilson & Lione

(57) ABSTRACT

The present disclosure provides an apparatus and a method for converting a protocol by a type of data, and a vehicle system. The apparatus includes a storage configured to store a conversion table that defines a protocol conversion method depending on the type of data, a protocol conversion device configured to receive Controller Area Network (CAN) data from a CAN node in a vehicle, to call the conversion table, to determine the protocol conversion method corresponding to a type of the CAN data, and to convert a communication protocol of the CAN data to an Ethernet-based communication protocol based on the protocol conversion method, and a transmission processing device configured to convert a message format of the CAN data to an Ethernet message format and to transmit the CAN data to an external server.

18 Claims, 11 Drawing Sheets

(52) U.S. Cl.
CPC .............. *H04L 69/18* (2013.01); *H04L 12/40* (2013.01); *H04L 2012/40215* (2013.01); *H04L 2012/40273* (2013.01)

(56) References Cited

U.S. PATENT DOCUMENTS

| | | | |
|---|---|---|---|
| 9,215,168 B2 | 12/2015 | Kim et al. | |
| 2011/0149982 A1* | 6/2011 | Hwang | H04L 12/4625 370/401 |
| 2013/0322449 A1* | 12/2013 | Hwang | H04L 45/50 370/392 |
| 2015/0229741 A1* | 8/2015 | Kim | H04L 12/4625 370/467 |
| 2017/0072876 A1* | 3/2017 | Rajan | G06F 13/4282 |
| 2018/0343326 A1* | 11/2018 | Wildfeuer | H04L 69/18 |
| 2019/0141133 A1* | 5/2019 | Rajan | G06F 13/4282 |

\* cited by examiner

| Data Type | | Conversion Type |
|---|---|---|
| MULTIMEDIA DATA | | MAC Layer CONVERSION |
| REAL-TIME CONTROL DATA | Extended_CAN | TCP Layer CONVERSION |
| | Normal_CAN | UDP/TCP Layer CONVERSION |
| DIAGNOSTIC COMMUNICATION DATA | | IP Layer CONVERSION |

FIG. 3

APPARATUS AND METHOD FOR CONVERTING PROTOCOL BY TYPE OF DATA AND VEHICLE SYSTEM

CROSS-REFERENCE TO RELATED APPLICATION

The present application claims priority to and the benefit of Korean Patent Application No. 10-2017-0144453, filed on Nov. 1, 2017, which is incorporated herein by reference in its entirety.

FIELD

The present disclosure relates to an apparatus and a method for converting a protocol by a type of data and a vehicle system.

BACKGROUND

The statements in this section merely provide background information related to the present disclosure and may not constitute prior art.

Recently, with the addition of various functions to the vehicle, a massive data communication may be desired due to inability of a Controller Area Network (CAN) to manage a network's bandwidth. To this end, some OEMs have been manufacturing vehicles with the network using Ethernet.

A connected car provides the necessary service by connecting to an external communication network. The connected car has been adopting a car network structure in which both a CAN method and an Ethernet method are available. In this case, it may be desirable to convert CAN data to Ethernet-based data for transmission.

Various forms of data are transmitted through the network of the connected car, for example (i) important data where the delivery status must be checked, (ii) less important data that need to be transmitted in real time, and (iii) data that may require a real-time control (QoS) and an acknowledgement (ACK) on whether the data are transmitted.

However, in a conventional protocol conversion method, each CAN data is converted according to a predetermined method, and thus a data transmission efficiency depending on priority, real-time transmission, and/or whether the data are transmitted may not be satisfactory.

SUMMARY

An aspect of the present disclosure provides an apparatus and a method for converting a protocol by a type of data and a vehicle system, which are capable of converting a communication protocol of CAN data to an Ethernet-based protocol by applying different protocol conversion methods depending on a type of CAN data. As a result, a protocol conversion may be improved for controlling different types of vehicle situations.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a protocol conversion apparatus where a protocol conversion is conducted depending on a type of data includes a storage storing a conversion table that defines a protocol conversion method depending on the type of data, a protocol conversion device that receives CAN data from a CAN node in a vehicle, calls the conversion table, determines the protocol conversion method corresponding to a type of the CAN data, and converts a communication protocol of the CAN data to an Ethernet-based communication protocol based on the protocol conversion method that is determined corresponding to the type of the CAN data, and a transmission processing device that converts a message format of the CAN data to an Ethernet message format and transmits the CAN data to an external server.

The conversion table includes a static conversion table that defines a Media Access Control (MAC) layer conversion method as the protocol conversion method for multimedia data, defines a Transmission Control Protocol (TCP) layer conversion method or an User Datagram Protocol (UDP)/TCP layer conversion method as the protocol conversion method for real-time control data, and defines an Internet Protocol (IP) layer conversion method as the protocol conversion method for diagnostic communication data.

In a case that the CAN data are the multimedia data, the protocol conversion device determines the MAC layer conversion method as the protocol conversion method based on the static conversion table and converts the communication protocol of the CAN data to an MAC protocol based on the MAC layer conversion method.

The protocol conversion device assigns a new protocol identifier to an Ethernet type field of an MAC header area and assigns channel information, a CAN ID, length information of the CAN data, and the CAN data to a payload field of a data area.

In a case that the CAN data are the diagnostic communication data, the protocol conversion device determines the IP layer conversion method as the protocol conversion method based on the static conversion table and converts the communication protocol of the CAN data to an IP protocol based on the IP layer conversion method.

The protocol conversion device changes an internet header length that is assigned to a header length field of a header area of an IP packet and assigns the CAN ID and the channel information to an options field.

In a case that the CAN data are extended real-time control data, the protocol conversion device determines the TCP layer conversion method as the protocol conversion method based on the static conversion table and converts the communication protocol of the CAN data to a TCP protocol based on the TCP layer conversion method.

The protocol conversion device assigns the CAN ID and the channel information to a sequence number field of a header area of a TCP packet that is sent and received during establishment of a virtual communication port between a vehicle system and an external server.

In a case that the CAN data are normal real-time control data, the protocol conversion device determines the UDP/TCP layer conversion method as the protocol conversion method based on the static conversion table and converts the communication protocol of the CAN data to a UDP/TCP protocol based on the UDP/TCP layer conversion method.

The protocol conversion device changes a port number of a source, which is assigned to a source port field of the header area of the TCP packet and a source port field of a header area of a UDP packet, to assign the CAN ID and changes a port number of a destination, which is assigned to a destination port field of the header area of the TCP packet and a destination port field of the header area of the UDP packet, to assign the CAN ID.

The conversion table includes a dynamic conversion table that defines a protocol conversion method added or supplemented depending on a real-time control situation of the vehicle.

The transmission processing device bundles payloads of a plurality of CAN messages based on a response time corresponding to the protocol conversion method of CAN data and bundle transmission information within the response time to generate the Ethernet message.

According to another aspect of the present disclosure, a method of converting a protocol by a type of data includes storing a conversion table that defines a protocol conversion method depending on the type of data, calling the conversion table to determine the protocol conversion method corresponding to a type of the CAN data when the CAN data are received from a CAN node in a vehicle, converting a communication protocol of the CAN data to an Ethernet-based communication protocol based on the protocol conversion method that is determined corresponding to the type of the CAN data, and converting a message format of the CAN data to an Ethernet message format to transmit the CAN data to an external server.

The conversion table includes a static conversion table that defines an MAC layer conversion method as the protocol conversion method for multimedia data, defines a TCP layer conversion method or a UDP/TCP layer conversion method as the protocol conversion method for real-time control data, and defines an IP layer conversion method as the protocol conversion method for diagnostic communication data and a dynamic conversion table that defines a protocol conversion method added or supplemented depending on a real-time control situation of the vehicle.

The converting of the communication protocol of the CAN data to the Ethernet-based communication protocol includes determining the MAC layer conversion method as the protocol conversion method based on the static conversion table in a case that the CAN data are the multimedia data, assigning a new protocol identifier to an Ethernet type field of an MAC header area based on the MAC layer conversion method, and assigning channel information, a CAN ID, length information of the CAN data, and the CAN data to a payload field of a data area to convert the communication protocol of the CAN data to an MAC protocol based on the MAC layer conversion method.

The converting of the communication protocol of the CAN data to the Ethernet-based communication protocol includes determining the IP layer conversion method as the protocol conversion method based on the static conversion table in a case that the CAN data are the diagnostic communication data, changing an internet header length assigned to a header length field of a header area of an IP packet, and assigning a CAN ID and channel information to an options field to convert the communication protocol of the CAN data to an IP protocol based on the IP layer conversion method.

The converting of the communication protocol of the CAN data to the Ethernet-based communication protocol includes determining the TCP layer conversion method as the protocol conversion method based on the static conversion table in a case that the CAN data are extended real-time control data and assigning a CAN ID and channel information to a sequence number field of a header area of a TCP packet, which is sent and received during establishment of a virtual communication port between a vehicle system and an external server, to convert the communication protocol of the CAN data to a TCP protocol based on the TCP layer conversion method.

The converting of the communication protocol of the CAN data to the Ethernet-based communication protocol includes determining the UDP/TCP layer conversion method as the protocol conversion method based on the static conversion table in a case that the CAN data are normal real-time control data, changing a port number of a source, which is assigned to a source port field of a header area of a TCP packet and a source port field of a header area of a UDP packet, to assign the CAN ID, and changing a port number of a destination, which is assigned to a destination port field of the header area of the TCP packet and a destination port field of the header area of the UDP packet, to assign the CAN ID, thereby converting the communication protocol of the CAN data to a UDP/TCP protocol based on the UDP/TCP layer conversion method.

The transmitting of the CAN data to the external server includes bundling payloads of a plurality of CAN messages based on a response time corresponding to the protocol conversion method of CAN data and bundle transmission information within the response time to generate the Ethernet message.

According to another aspect of the present disclosure, a vehicle system includes a CAN node connected to a plurality of control units installed in a vehicle to transmit CAN data and, a protocol conversion apparatus that calls a conversion table that defines a protocol conversion method depending on the type of data when receiving the CAN data from a CAN node in the vehicle, determines the protocol conversion method corresponding to the type of the CAN data, converts a communication protocol of the CAN data to an Ethernet-based communication protocol based on the protocol conversion method that is determined corresponding to the type of the CAN data, and converts a message format of the CAN data to an Ethernet message format to transmit the CAN data to an external server.

According to the above, the communication protocol of the CAN data is converted to the Ethernet-based protocol by applying different protocol conversion methods to the CAN data depending on the type of the CAN data. As a result, the protocol conversion may be improved for controlling different types of vehicle situations.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a view illustrating a conversion table;

Figure 1:
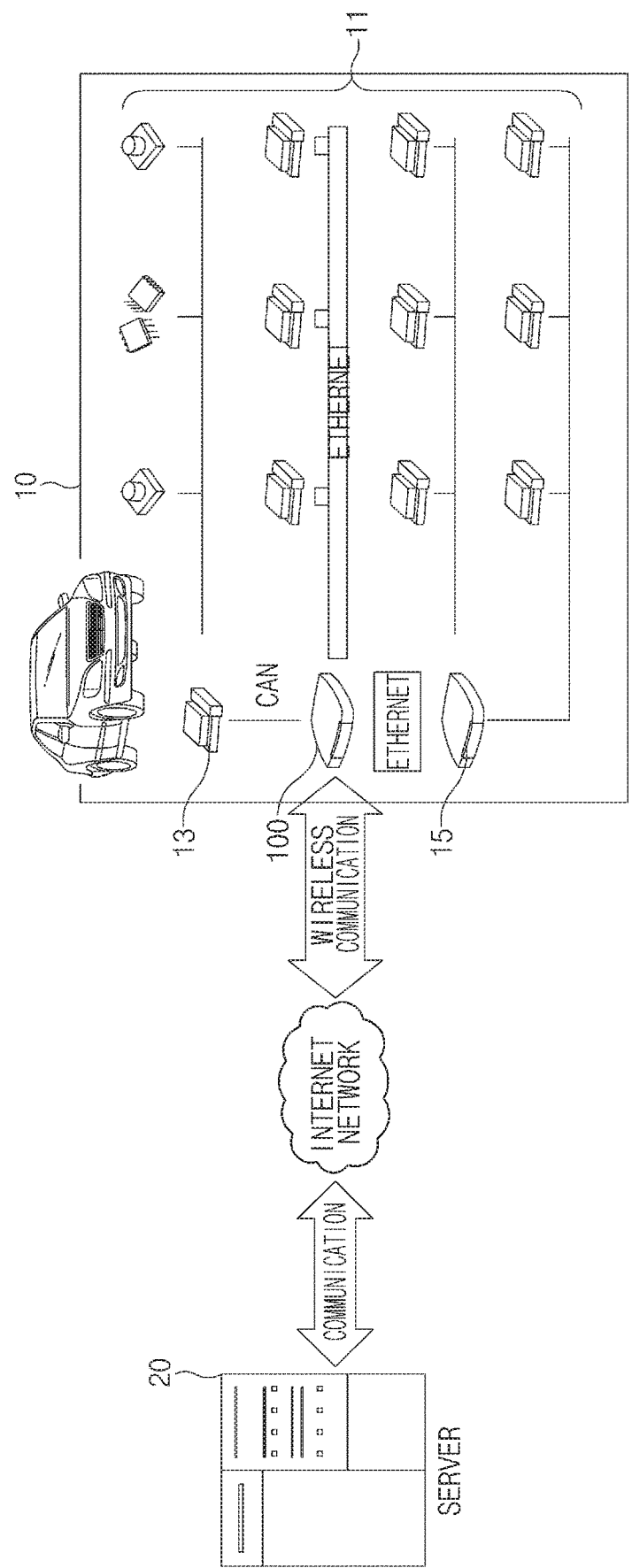
FIG. 1 is a view illustrating a vehicle system to which a protocol conversion apparatus by a type of data is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary forms of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An apparatus and a method for converting a protocol by a type of data and a vehicle system in some forms of the present disclosure are applied to a connected vehicle. The connected vehicle is wirelessly connected to other vehicles or a transportation and communication infrastructure to provide a danger warning service, a real-time navigation service, a remote vehicle control service, a maintenance service, and/or a diagnostic service.

FIG. 1 is a view illustrating a vehicle system 10 to which a protocol conversion apparatus by a type of data is applied in some forms of the present disclosure.

Referring to FIG. 1, the vehicle system 10 in some forms of the present disclosure may include a plurality of control units 11 installed in a vehicle and the protocol conversion apparatus 100 that receives data of the control units 11 through a vehicle network and transmits the data to a server 20 connected to an internet network.

The control units 11 may transmit the data to a CAN (Controller Area Network) node 13 using a CAN communication or an LIN (Local Interconnect Network) communication. In this case, the CAN node 13 may transmit the data provided thereto to the protocol conversion apparatus 100. In addition, the control units 11 may transmit the data to an Ethernet node 15 using an Ethernet communication, and the Ethernet node 15 may transmit the data received thereto to the protocol conversion apparatus 100.

The protocol conversion apparatus 100 may be connected to the internet network by an Ethernet communication method to transmit the data received from the CAN node 13 and/or the Ethernet node 15 to the server 20 connected to the internet network. Accordingly, the protocol conversion apparatus 100 may transmit the data received from the Ethernet node 15 to the server 20 without a separate protocol conversion procedure.

Meanwhile, the protocol conversion apparatus 100 may transmit the data received from the CAN node 13 to the server 20 connected to the internet network after converting a communication protocol of the data received from the CAN node 13 to an Ethernet-based communication protocol, such as a media access control (MAC), an internet protocol (IP), a transmission control protocol (TCP), a user datagram protocol (UDP)/TCP, or the like. In this case, the protocol conversion apparatus 100 may convert the communication protocol of the data from the CAN node 13 by applying different protocol conversion methods to the data from the CAN node 13 depending on the type of the data received from the CAN node 13.

As an example, the protocol conversion apparatus 100 may convert the communication protocol of the data received from the CAN node 13 to the Ethernet-based communication protocol using a MAC layer conversion method, an IP layer conversion method, a TCP layer conversion method, or a UDP/TCP layer conversion method depending on the type of the data received from the CAN node 13.

Hereinafter, a configuration of the protocol conversion apparatus 100 will be described in detail with reference to FIG. 2.

The protocol conversion apparatus 100 in some forms of the present disclosure may be implemented in the vehicle. In this case, the protocol conversion apparatus 100 may be integrally formed with internal control units of the vehicle or connected to the control units of the vehicle by a separate connection unit after being implemented in a separate apparatus.

Figure 2:
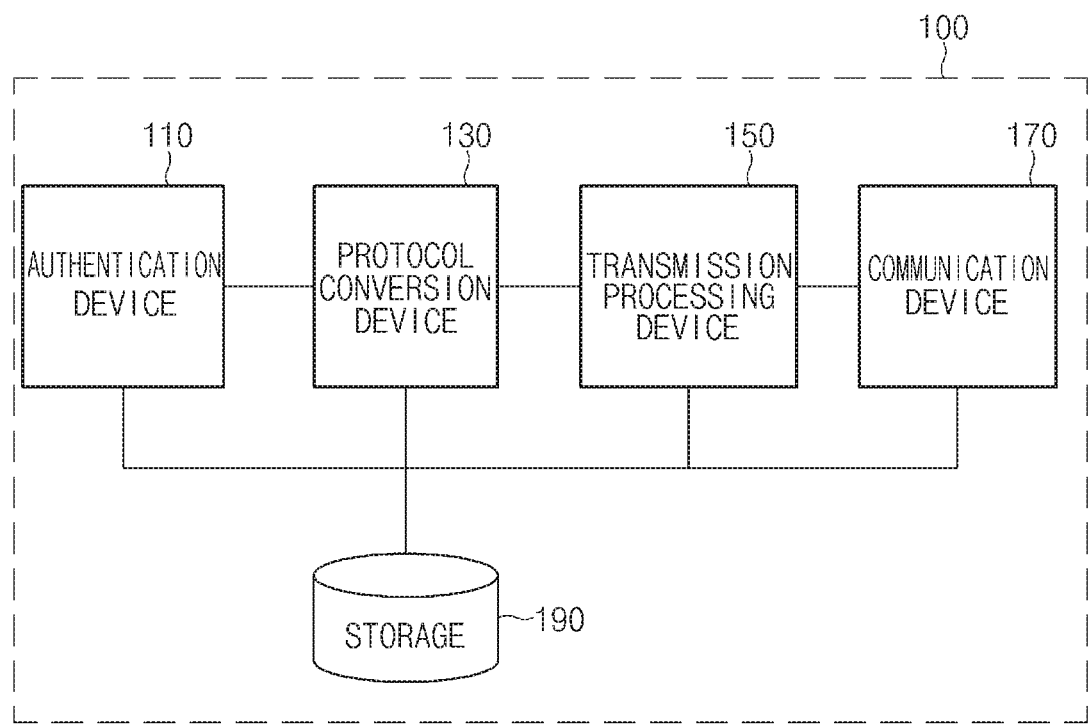
FIG. 2 is a view illustrating a configuration of a protocol conversion apparatus by a type of data.

FIG. 2 is a view illustrating a configuration of the protocol conversion apparatus 100 by the type of data in some forms of the present disclosure.

Referring to FIG. 2, the protocol conversion apparatus 100 may include an authentication device 110, a protocol conversion device 130, a transmission processing device 150, a communication device 170, and a storage 190.

The authentication device 110 performs a security check on the communication protocol of the data (hereinafter, referred to as "CAN data") received from the CAN node 13 and an authorization check on an Ethernet protocol conversion and determines suitability for the protocol conversion of the CAN data based on the check result. As an example, the authentication device 110 may check whether a control authority is granted, whether a driver is allowed to drive, a load of CAN/Ethernet communication, an application (APP), whether a message (MSG) and/or a signal allocation is exceeded, whether a CPU and/or a memory is exceeded, and the like.

When an authentication of the authentication device 110 is completed, the protocol conversion device 130 converts the communication protocol of the CAN data received thereto to the Ethernet-based communication protocol.

In this case, the protocol conversion device 130 may call a conversion table registered in the storage 190 and determine a protocol conversion method of corresponding data based on the called conversion table.

Here, the conversion table may include a static conversion table and a dynamic conversion table. The static conversion table may define the protocol conversion method by the type of data. Some forms of the static conversion table will be described in detail with reference to FIG. 3.

Referring to FIG. 3, the static conversion table may define the MAC layer conversion method, the IP layer conversion method, the TCP layer conversion method, or the UDP/TCP layer conversion method.

As an example, the static conversion table may define the MAC layer conversion method as a protocol conversion method of multimedia data.

In addition, the static conversion table may define the TCP layer conversion method or the UDP/TCP layer conversion method as a protocol conversion method of real-time control data. Here, in a case that the real-time control data are extended CAN data, the TCP layer conversion method may be defined, and in a case that the real-time control data are normal CAN data, the UDP/TCP layer conversion method may be defined.

In addition, the static conversion table may define the IP layer conversion method as a protocol conversion method of diagnostic communication data. FIG. 3 illustrates an example of the static conversion table, the static conversion table should not be limited thereto or thereby, and the static conversion table may be changed in some forms of the present disclosure.

Meanwhile, the dynamic conversion table may define a protocol conversion method added or supplemented depending on the (real-time) control situation of the vehicle after production of the vehicle.

Accordingly, the protocol conversion device 130 may determine the protocol conversion method corresponding to the data from the called static conversion table and/or the dynamic conversion table.

When one protocol conversion method is determined among the MAC layer conversion method, the IP layer conversion method, the TCP layer conversion method, and the UDP/TCP layer conversion method, the protocol conversion device 130 may convert the communication protocol of the corresponding CAN data using the determined protocol conversion method.

In some forms of the present disclosure, in a case that the CAN data are the multimedia data, the protocol conversion device 130 may determine the protocol conversion method to the MAC layer conversion method depending on the conversion methods defined in the static conversion table. Accordingly, the protocol conversion device 130 converts the communication protocol of the CAN data to an MAC protocol based on the MAC layer conversion method. Here, the MAC protocol is capable of high-speed communication and is suitable for one-to-one communication. In addition, size of the MAC protocol may be free defined in 1500 bytes or less by user, and the MAC protocol may correspond to the extended CAN.

Some forms of the present disclosure that converts the communication protocol of the CAN data using the MAC layer conversion method will be described in detail with reference to FIG. 4.

Figure 4:
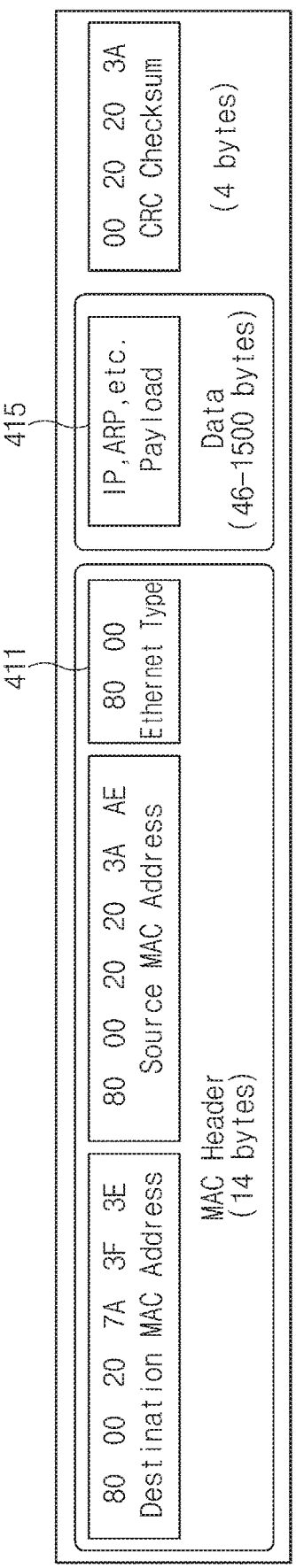
FIGS. 4 to 7B are views illustrating an operation of a protocol conversion apparatus.

Referring to FIG. 4, an Ethernet frame structure includes an MAC header area, a data area, and a CRC area.

In some forms of the present disclosure, the MAC header area includes a destination MAC address, a source MAC address, and an Ethernet type field 411. In addition, the data area includes a payload field 415.

The Ethernet type field 411 of the MAC header area is a field to assign a packet type, and the protocol conversion device 130 assigns a new tag protocol identifier (TPID) to the Ethernet type field 411 of the MAC header area and assigns channel information, a CAN ID, length information of the CAN data, and the CAN data to the payload field 415 of the data area to convert the communication protocol of the multimedia CAN data to the MAC protocol.

In this case, the protocol conversion device 130 may additionally assign the total number of repetitions to the payload field 415 of the data area.

The TPID assigned to the Ethernet type field 411 of the MAC header area is as Table 1 below.

TABLE 1

| Ethernet Type TPID | Protocol |
|---|---|
| 0x0800 | Internet Protocol version 4 (IPv4) |
| 0x0806 | Address Resolution Protocol (ARP) |
| 0x0842 | Wake-on-LAN |
| 0x22F3 | IETF TRILL Protocol |
| 0x6003 | DECnet Phase IV |
| 0x8035 | Reverse Address Resolution Protocol |
| 0x809B | AppleTalk (Ethertalk) |
| 0x80F3 | AppleTalk Address Resolution Protocol (AARP) |
| 0x8100 | VLAN-tagged frame (IEEE 802.1Q) and Shortest Path Bridging IEEE 802.1aq |
| 0x892F | High-availability Seamless Redundancy (HSR) |
| 0x9000 | Ethernet Configuration Testing Protocol |
| 0x9100 | VLAN-tagged frame with double tagging |

Table 1 defines the TPID depending on the type of protocol, such as Internet Protocol version 4 (IPv4), Address Resolution Protocol (ARP), Wake-on-LAN, IETF TRILL Protocol, DECnet Phase IV, Reverse Address Resolution Protocol, AppleTalk(Ethertalk), AppleTalk Address Resolution Protocol (AARP), VLAN-tagged frame (IEEE 802.1Q) and Shortest Path Bridging JEFF 802.1aq, High-availability Seamless Redundancy (HSR), Ethernet Configuration Testing Protocol, VLAN-tagged frame with double tagging, and so on.

As an example, in a case that the communication protocol of the CAN data is converted to the Internet Protocol version 4 (IPv4) protocol, the protocol conversion device 130 may assign the TPID to '0x0800'.

In some forms of the present disclosure, in a case that the CAN data are the diagnostic communication data, the protocol conversion device 130 may determine the protocol conversion method to the IP layer conversion method based on the conversion methods defined in the static conversion table. Accordingly, the protocol conversion device 130 converts the communication protocol of the CAN data to an IP protocol based on the IP layer conversion method. Here, the IP protocol is capable of medium-speed communication. In addition, the IP protocol may be applied to a tree-type switch structure.

Some forms of the present disclosure that converts the communication protocol of the CAN data using the IP layer conversion method will be described in detail with reference to FIG. 5.

Figure 5:
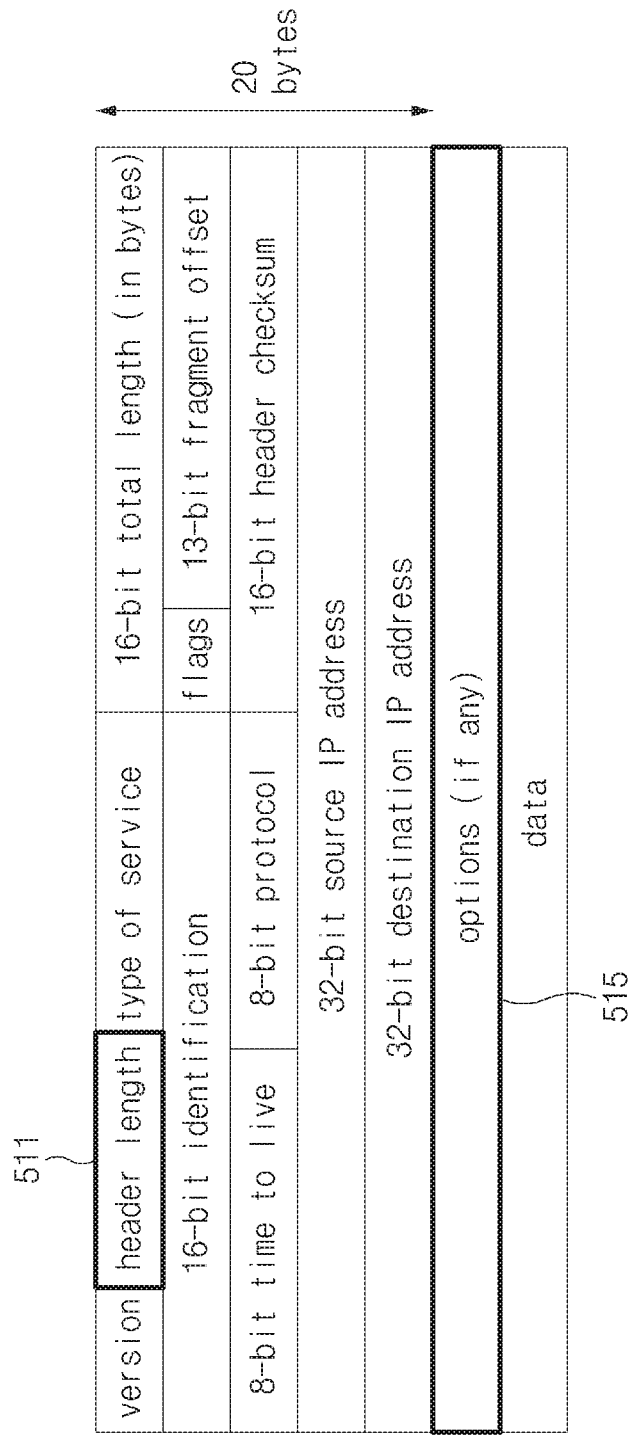

FIG. 5 illustrates a header structure of an IP packet, and a header area of the IP packet includes a version field, a header length field 511, a type of service field, . . . , options field 515, and a data field.

In some forms of the present disclosure, the header length field 511 is a field to assign a length of the header in the IP packet, and the protocol conversion device 130 changes an Internet Header Length assigned to the header length field 511 and assigns the CAN ID and the channel information to the options field 515 to convert the communication protocol of the CAN data to the IP protocol for the diagnostic communication.

As an example, the protocol conversion device 130 may assign '6' to the header length field 511 to secure 4 byte and assign 29-bit CAN ID (Extended CAN ID) and 3-bit channel information to the options field 515.

In some forms of the present disclosure, in a case that the CAN data are the extended real-time control data, the protocol conversion device 130 may determine the protocol conversion method to the TCP layer conversion method based on the conversion methods defined in the static conversion table. Accordingly, the protocol conversion device 130 converts the communication protocol of the CAN data to a TCP protocol based on the TCP layer conversion method. Here, the TCP protocol is capable of using the extended CAN ID. In addition, the TCP protocol may have high connection reliability and does not suffer from performance degradation.

Some forms of the present disclosure that converts the communication protocol of the CAN data using the TCP layer conversion method will be described in detail with reference to FIGS. 6A and 6B.

The TCP is required to set a virtual path before a client (vehicle system) sends and receives packets to and from the server 20 of destination.

Figure 6A:
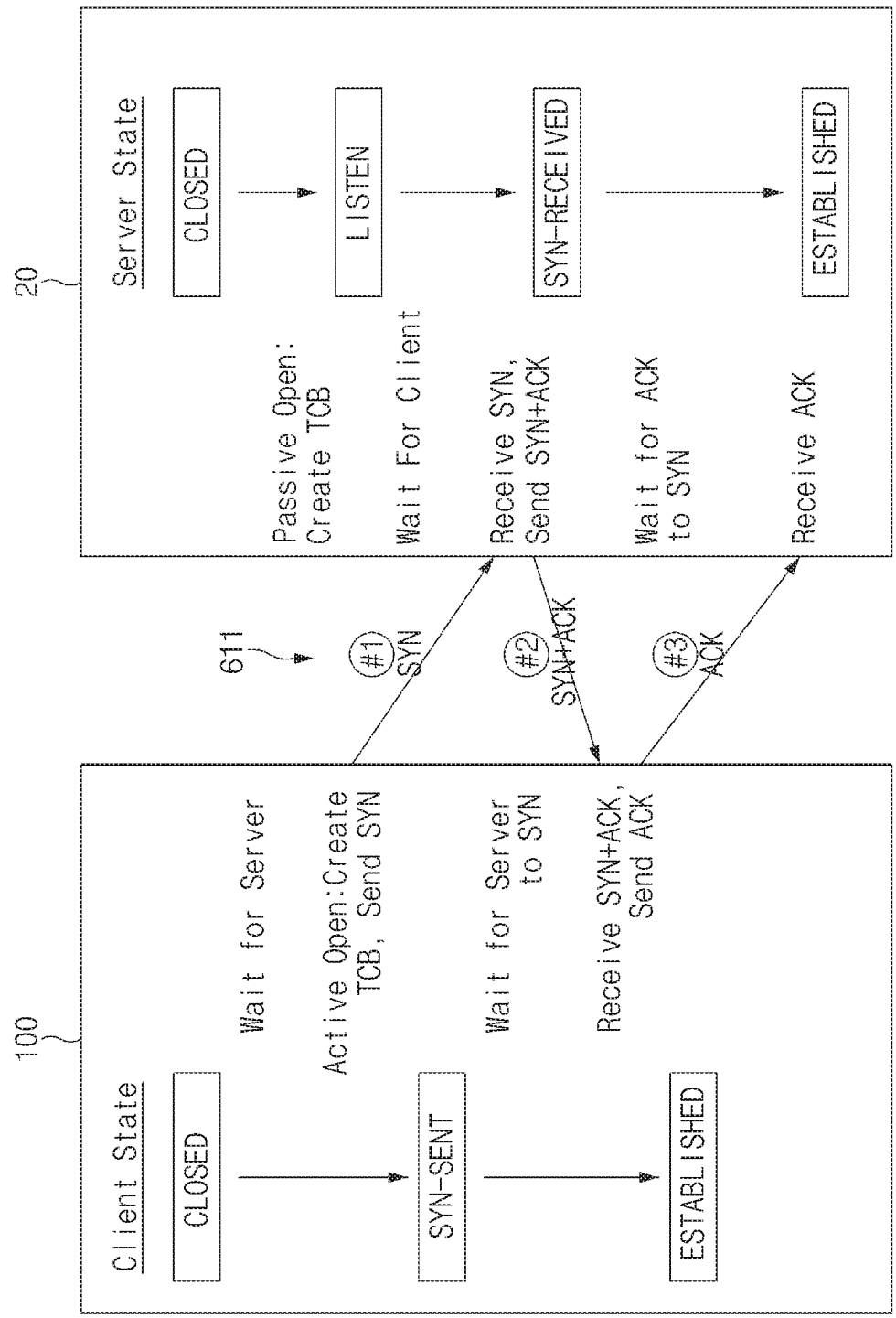

As shown in FIG. 6A, the client is in a "CLOSED" state in which a port is closed before the virtual path is set, and the server 20 is in a "LISTEN" state to provide a service at all times.

The client may assign an arbitrary port and send "#1" a connection request "SYN" signal to the server 20 to start the communication. In this case, the server 20 is in a "SYN-RECEIVED" state of the client and sends (#2) a "SYN+ACK" signal to the client, and the client receives the "SYN+ACK" signal and sends (#3) an acknowledgement "ACK" signal to the server 20 in response to the "SYN+ACK" signal.

Accordingly, the virtual path is set between the client and the server 20 of destination.

In this case, the protocol conversion device 130 inserts the CAN ID and the channel information into a TCP packet in the "SYN" processes (#1 to #3) 611 to convert the communication protocol of the extended CAN data transmitted in real-time to the Ethernet-based communication protocol.

Figure 6B:
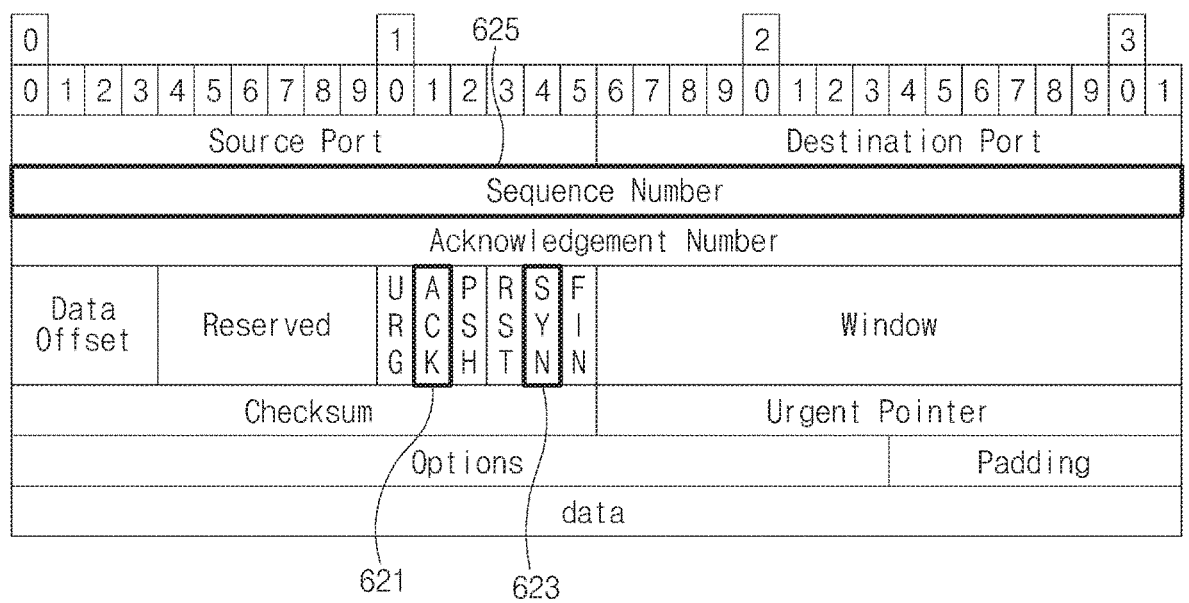

FIG. 6B illustrates a TCP header structure of the TCP packet, and a head area of the TCP packet includes a source port field, a destination port field, a sequence number field 625, an ACK field 621, an SYN field 623, . . . , a data field.

The sequence number field 625 is a field that assigns a unique number to track multiple messages with one identifier, and the protocol conversion device 130 assigns relevant information to the ACK field 621 and the SYN field 623 in the "SYN" processes (#1 to #3) 611 shown in FIG. 6A and substantially simultaneously assigns the CAN ID and the channel information to the sequence number field 625 to convert the communication protocol of the extended CAN data transmitted in real time to the TCP protocol.

In some form of the present disclosure, in a case that the CAN data are the normal real-time control data, the protocol conversion device 130 may determine the protocol conversion method to the UDP/TCP layer conversion method based on the conversion methods defined in the static conversion table. Accordingly, the protocol conversion device 130 converts the communication protocol of the CAN data to a UDP/TCP protocol based on the UDP/TCP layer conversion method. Here, the UDP/TCP protocol is capable of controlling only for the normal CAN ID and determining a position of socket by taking into account a performance of a controller.

Some forms of the present disclosure that converts the communication protocol of the CAN data using the UDP/TCP layer conversion method will be described in detail with reference to FIGS. 7A and 7B.

Figure 7A:
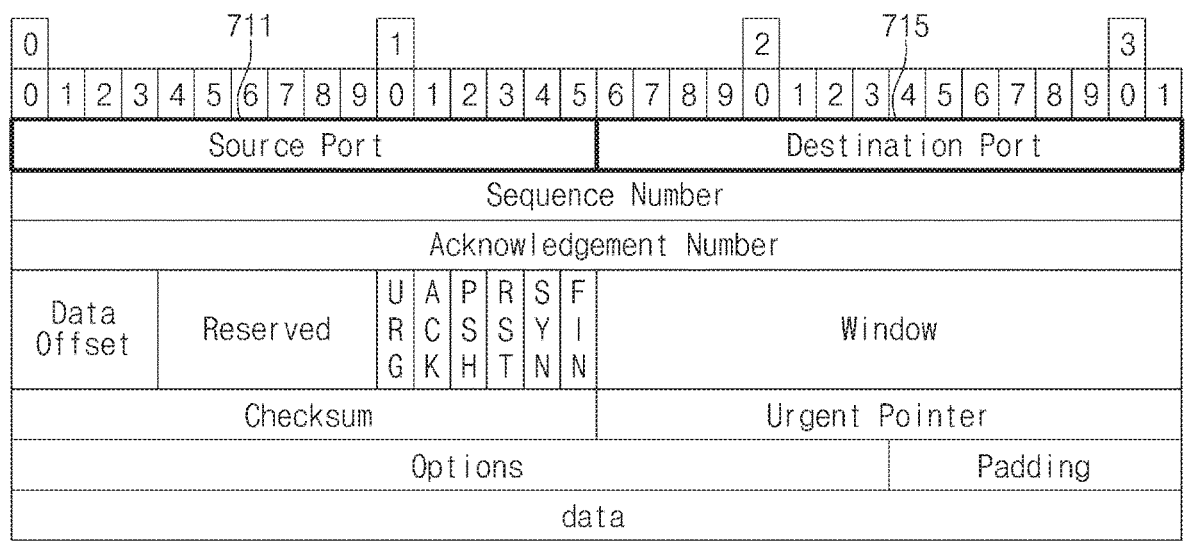
Figure 7B:
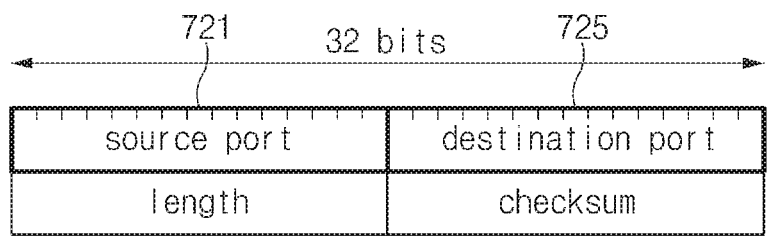

FIG. 7A illustrates a TCP header structure of a TCP packet, and FIG. 7B illustrates a UDP header structure of a UDP packet.

Referring to FIG. 7A, the header area of the TCP packet includes a source port field 711, a destination port field 715, the sequence number field, the ACK field, the SYN field, . . . , the data field.

Referring to FIG. 7B, the header area of the UDP packet includes a source port field 721, a destination port field 725, a length field, and a checksum field.

The source port field 711 of the TCP header area and the source port field 721 of the UDP header area are fields to assign a port number of the source, and the protocol conversion device 130 changes the port number of the source, which is assigned to the source port field 711 of the TCP header area and the source port field 721 of the UDP header area, to assign the CAN ID and changes a port number of the destination, which is assigned to the destination port field 715 of the TCP header area and the destination port field 725 of the UDP header area, to assign the CAN ID, thereby converting the communication protocol of the normal CAN data, which are transmitted in real time, to the Ethernet-based communication protocol.

As described above, the protocol conversion apparatus 100 may insert the CAN ID and the channel information into the MAC header, the IP header, the TCP header, and/or the UDP header of the Ethernet message, and thus the communication protocol of the CAN data may be converted to the Ethernet-based communication protocol.

The transmission processing device 150 converts a CAN message format to an Ethernet message format. As an example, the transmission processing device 150 converts a payload field of 8 byte of the CAN message format to a payload field of 1500 byte of the Ethernet message format.

In addition, when the CAN message format is converted to the Ethernet message format, the transmission processing device 150 may bundle payloads of plural CAN messages based on a response time corresponding to the protocol conversion method of corresponding CAN data and the bundle transmission information within the response time to generate the Ethernet message.

The transmission processing device 150 transmits the Ethernet message to the communication device 170.

The communication device 170 may include a communication module that supports a communication interface with electrical equipments and/or control units in the vehicle. In some forms of the present disclosure, the communication module may include a module that supports a vehicle network communication, e.g., a CAN communication, an LIN communication, an Ethernet communication, etc.

In addition, the communication device 170 may further include a communication module for wireless internet access. The communication module may include a module that supports the Ethernet communication with the server 20 collecting vehicle data and managing control data of the vehicle.

In this case, the communication device 170 transmits the Ethernet message provided from the transmission processing device 150 to the server 20 connected thereto by the internet network.

The storage 190 may store data and/or algorithm, which are required to operate the protocol conversion apparatus 100.

As an example, the storage 190 may store the static conversion table and/or the dynamic conversion table. In addition, the storage 190 may store instructions and/or algorithms to control the conversion of the communication protocol of the CAN data. In addition, the storage 190 may store instructions and/or algorithms to convert the CAN message format to the Ethernet message format.

In some forms of the present disclosure, the storage 190 may include a storage medium, such as a random access memory (RAM), a static random access memory (SRAM), a read-only memory (ROM), a programmable read-only memory (PROM), an electrically erasable programmable read-only memory (EEPROM), etc.

The protocol conversion apparatus 100 operated as described above in some forms of the present disclosure may be implemented in one independent hardware including a memory and a processer processing each operation and driven as at least one or more processors while being included in other hardware, e.g., a microprocessor or a general-purpose computer system. In addition, the authentication device 110, the protocol conversion device 130, and/or the transmission processing device 150 of the protocol conversion apparatus 100 in some forms of the present disclosure may be implemented in at least one processor.

Hereinafter, an operation of the apparatus having the above-mentioned configurations in some forms of the present disclosure will be described in detail.

Figure 8:
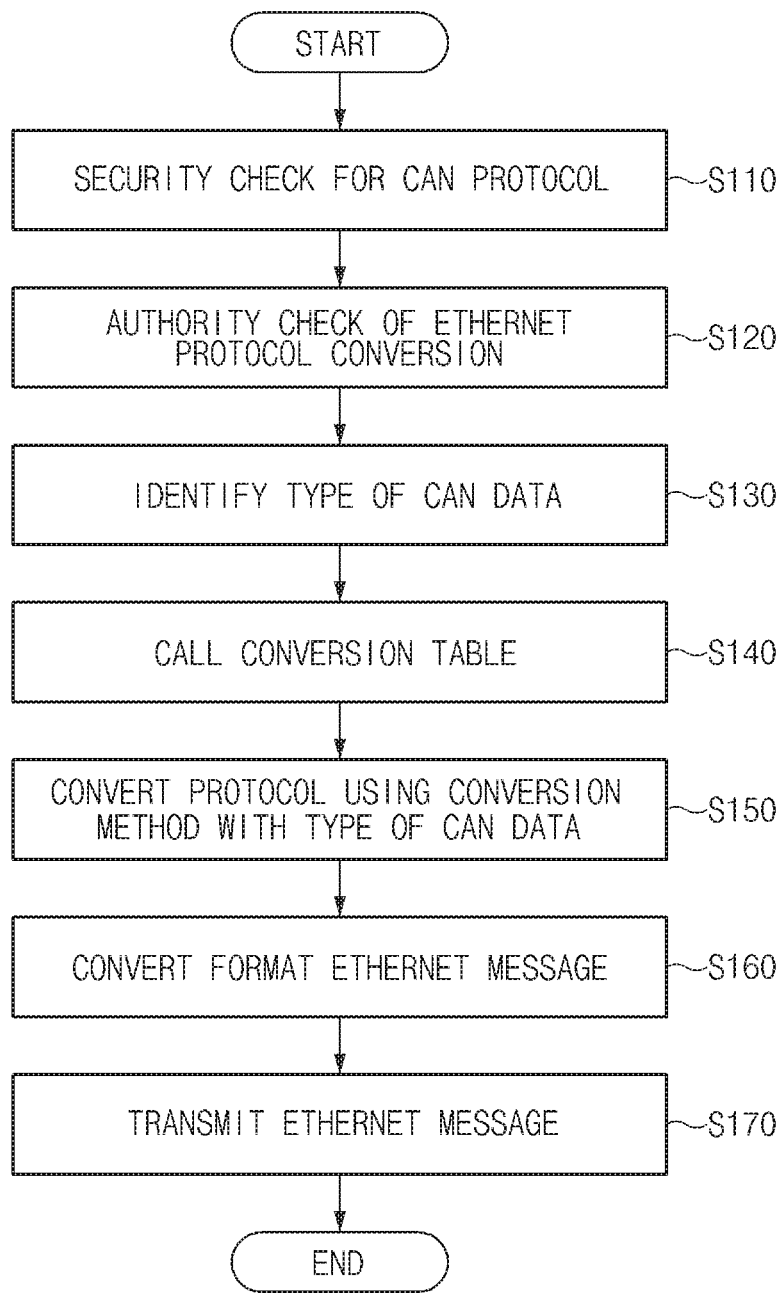
FIG. 8 is a view illustrating an operation of a protocol conversion apparatus.

FIG. 8 is a view illustrating an operation of a protocol conversion apparatus in some forms of the present disclosure.

Referring to FIG. 8, the protocol conversion apparatus 100 performs the security check on the CAN protocol in which the protocol conversion is executed and the authority check on the Ethernet protocol conversion (S110 and S120).

When the check operations S110 and S120 are completed, the protocol conversion apparatus 100 identifies the type of the CAN data received thereto (S130). As an example, the CAN data may be the multimedia data, the real-time control data, or the diagnostic communication data.

The protocol conversion apparatus 100 calls the conversion table previously stored in the storage 190 (S140). The conversion table is a table that defines the protocol conversion method depending on the type of the CAN data and includes the static conversion table and/or the dynamic conversion table.

The protocol conversion method depending on the type of the CAN data is determined based on the conversion table called in operation S140', and the communication protocol of the CAN data is converted to the Ethernet-based communication protocol depending on the determined protocol conversion method (S150). The protocol conversion apparatus 100 may convert the communication protocol of the CAN data to the Ethernet-based communication protocol based on the MAC layer conversion method, the IP layer conversion method, the TCP layer conversion method, or the UDP/TCP layer conversion method. The protocol conversion method by the type of the CAN data is the same as that described with reference to FIG. 3.

The protocol conversion apparatus 100 may insert the CAN ID and the channel information into the MAC header, the IP header, the TCP header, and/or the UDP header of the Ethernet message in the process for converting the communication protocol with respect to the CAN data.

Then, the protocol conversion apparatus 100 converts the CAN message format to the Ethernet message format (S160). In this case, the protocol conversion apparatus 100 may bundle the payloads of the CAN messages as much as possible based on the response time corresponding to the protocol conversion method of the corresponding CAN data and the bundle transmission information within the response time to generate the Ethernet message.

The protocol conversion apparatus 100 transmits the generated Ethernet message to the server 20 connected to the internet network (S170).

Figure 9:
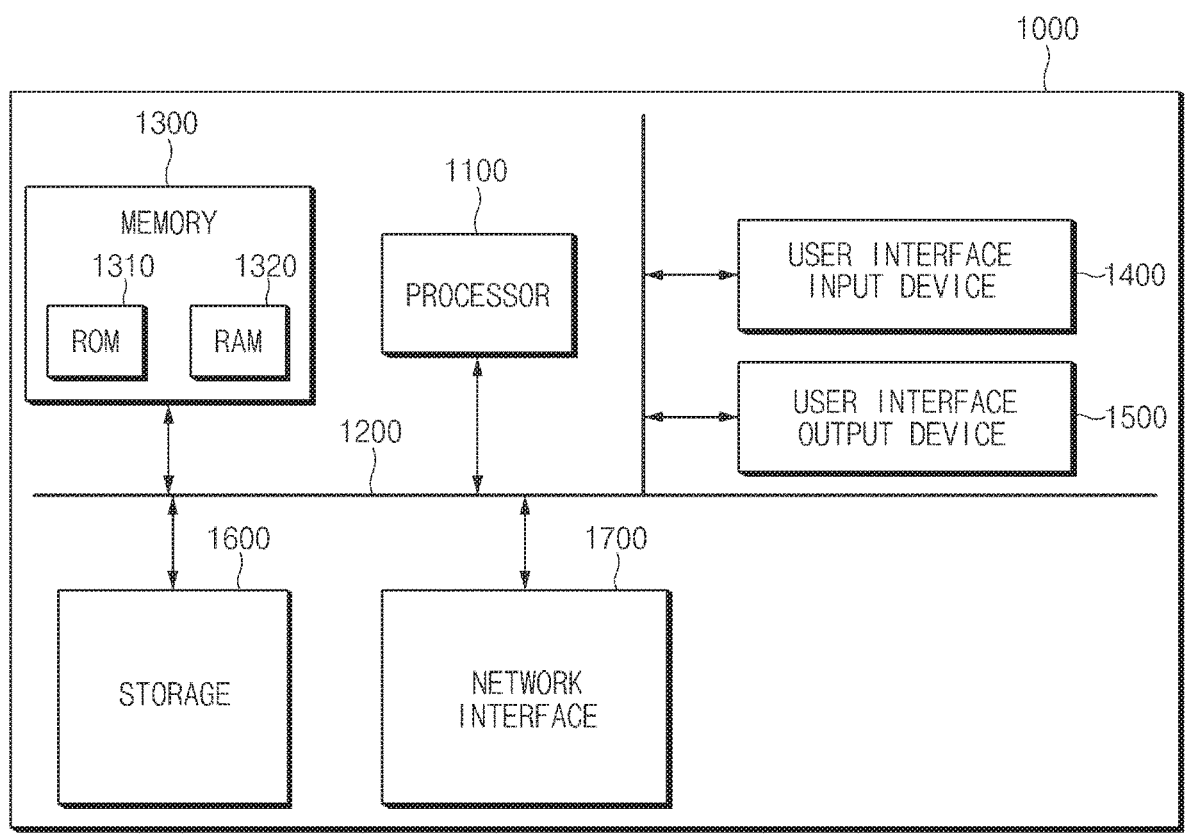
FIG. 9 is a block diagram illustrating a configuration of a computing system that executes a protocol conversion method.

FIG. 9 is a block diagram illustrating a configuration of a computing system that executes the protocol conversion method in some forms of the present disclosure.

Referring to FIG. 9, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with some forms of the present disclosure disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component in the user terminal.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A protocol conversion apparatus where a protocol conversion is conducted depending on a type of data, the apparatus comprising:
   a storage configured to store a conversion table that defines a protocol conversion method depending on the type of data;
   a protocol conversion device configured to:
      receive Controller Area Network (CAN) data from a CAN node in a vehicle;
      call the conversion table;
      determine the protocol conversion method corresponding to a type of the CAN data; and
      convert a communication protocol of the CAN data to an Ethernet-based communication protocol based on the protocol conversion method that is determined corresponding to the type of the CAN data; and
   a transmission processing device configured to:
      convert a message format of the CAN data to an Ethernet message format;
      and transmit the CAN data to an external server,
   wherein the conversion table comprises a static conversion table that is configured to:

define a Media Access Control (MAC) layer conversion method as the protocol conversion method for multimedia data;
define a Transmission Control Protocol (TCP) layer conversion method or a User Datagram Protocol (UDP)/TCP layer conversion method as the protocol conversion method for real-time control data; and
define an Internet Protocol (IP) layer conversion method as the protocol conversion method for diagnostic communication data.

2. The protocol conversion apparatus of claim 1 where the CAN data are the multimedia data, wherein the protocol conversion device is configured to:
determine the MAC layer conversion method as the protocol conversion method based on the static conversion table; and
convert the communication protocol of the CAN data to a MAC protocol based on the MAC layer conversion method.

3. The protocol conversion apparatus of claim 2, wherein the protocol conversion device is configured to:
assign a new protocol identifier to an Ethernet type field of an MAC header area; and
assign channel information, a CAN ID, length information of the CAN data, and the CAN data to a payload field of a data area.

4. The protocol conversion apparatus of claim 1 where the CAN data are the diagnostic communication data, wherein the protocol conversion device is configured to:
determine the IP layer conversion method as the protocol conversion method based on the static conversion table; and
convert the communication protocol of the CAN data to an IP protocol based on the IP layer conversion method.

5. The protocol conversion apparatus of claim 4, wherein the protocol conversion device is configured to:
change an internet header length that is assigned to a header length field of a header area of an IP packet; and
assign the CAN ID and the channel information to an options field.

6. The protocol conversion apparatus of claim 1 where the CAN data are extended real-time control data, wherein the protocol conversion device is configured to:
determine the TCP layer conversion method as the protocol conversion method based on the static conversion table; and
convert the communication protocol of the CAN data to a TCP protocol based on the TCP layer conversion method.

7. The protocol conversion apparatus of claim 6, wherein the protocol conversion device is configured to:
assign the CAN ID and the channel information to a sequence number field of a header area of a TCP packet that is sent and received during establishment of a virtual communication port between a vehicle system and an external server.

8. The protocol conversion apparatus of claim 7 where the CAN data are normal real-time control data, wherein the protocol conversion device is configured to:
determine the UDP/TCP layer conversion method as the protocol conversion method based on the static conversion table; and
convert the communication protocol of the CAN data to a UDP/TCP protocol based on the UDP/TCP layer conversion method.

9. The protocol conversion apparatus of claim 8, wherein the protocol conversion device is configured to:
change a port number of a source that is assigned to a source port field of the header area of the TCP packet and a source port field of a header area of a UDP packet and assign the CAN ID; and
change a port number of a destination that is assigned to a destination port field of the header area of the TCP packet and a destination port field of the header area of the UDP packet and assign the CAN ID.

10. The protocol conversion apparatus of claim 1 where the conversion table comprises a dynamic conversion table, wherein the dynamic conversion table is configured to define a protocol conversion method that is added or supplemented depending on a real-time control situation of the vehicle.

11. The protocol conversion apparatus of claim 1, wherein the transmission processing device is configured to:
bundle payloads of a plurality of CAN messages based on a response time and transmission information; and
generate an Ethernet message within the response time,
wherein the response time corresponds to the protocol conversion method of the CAN data.

12. A method of converting a protocol by a type of data, the method comprising:
storing a conversion table that is configured to define a protocol conversion method depending on the type of data;
when Controller Area Network (CAN) data are received from a CAN node in a vehicle, calling the conversion table to determine the protocol conversion method corresponding to a type of the CAN data;
converting a communication protocol of the CAN data to an Ethernet-based communication protocol based on the protocol conversion method that is determined corresponding to the type of the CAN data; and
converting a message format of the CAN data to an Ethernet message format to transmit the CAN data to an external server,
wherein calling the conversion table to determine the protocol conversion method corresponding to the type of the CAN data comprises:
defining, with a static conversion table, a Media Access Control (MAC) layer conversion method as the protocol conversion method for multimedia data;
defining, with the static conversion table, a Transmission Control Protocol (TCP) layer conversion method or a User Datagram Protocol (UDP)/TCP layer conversion method as the protocol conversion method for real-time control data;
defining, with the static conversion table, an Internet Protocol (IP) layer conversion method as the protocol conversion method for diagnostic communication data; and
defining, with a dynamic conversion table, a protocol conversion method that is added or supplemented depending on a real-time control situation of the vehicle.

13. The method of claim 12, wherein converting the communication protocol of the CAN data to the Ethernet-based communication protocol comprises:
when the CAN data are the multimedia data, determining the MAC layer conversion method as the protocol conversion method based on the static conversion table;
assigning a new protocol identifier to an Ethernet type field of an MAC header area based on the MAC layer conversion method;
assigning channel information, a CAN ID, length information of the CAN data, and the CAN data to a payload field of a data area; and converting the communication protocol of the CAN data to a MAC protocol based on the MAC layer conversion method.

14. The method of claim 12, wherein converting the communication protocol of the CAN data to the Ethernet-based communication protocol comprises:
   when the CAN data are the diagnostic communication data, determining the IP layer conversion method as the protocol conversion method based on the static conversion table;
   changing an internet header length that is assigned to a header length field of a header area of an IP packet;
   assigning the CAN ID and the channel information to an options field; and
   converting the communication protocol of the CAN data to an IP protocol based on the IP layer conversion method.

15. The method of claim 12, wherein converting the communication protocol of the CAN data to the Ethernet-based communication protocol comprises:
   when the CAN data are extended real-time control data, determining the TCP layer conversion method as the protocol conversion method based on the static conversion table;
   assigning the CAN ID and the channel information to a sequence number field of a header area of a TCP packet that is sent and received during establishment of a virtual communication port between a vehicle system and an external server; and
   converting the communication protocol of the CAN data to a TCP protocol based on the TCP layer conversion method.

16. The method of claim 12, wherein converting the communication protocol of the CAN data to the Ethernet-based communication protocol comprises:
   when the CAN data are normal real-time control data, determining the UDP/TCP layer conversion method as the protocol conversion method based on the static conversion table;
   changing a port number of a source that is assigned to a source port field of the header area of the TCP packet and a source port field of a header area of a UDP packet to assign the CAN ID;
   changing a port number of a destination that is assigned to a destination port field of the header area of the TCP packet and a destination port field of the header area of the UDP packet to assign the CAN ID; and
   converting the communication protocol of the CAN data to a UDP/TCP protocol based on the UDP/TCP layer conversion method.

17. The method of claim 12, wherein transmitting the CAN data to the external server comprises:
   bundling payloads of a plurality of CAN messages based on a response time and transmission information within the response time to generate the Ethernet message, wherein the response time corresponds to the protocol conversion method of the CAN data.

18. A vehicle system comprising:
   a Controller Area Network (CAN) node configured to:
      connect to a plurality of control units that are installed in a vehicle; and
      transmit CAN data; and
   when the CAN data is received from the CAN node in the vehicle, a protocol conversion apparatus configured to:
      call a conversion table that defines a protocol conversion method by a type of data;
      determine the protocol conversion method corresponding to a type of the CAN data;
      convert a communication protocol of the CAN data to an Ethernet-based communication protocol based on the protocol conversion method that is determined corresponding to the type of the CAN data; and
      convert a message format of the CAN data to an Ethernet message format;
      and transmit the CAN data to an external server,
   wherein the conversion table comprises a static conversion table that is configured to:
      define a Media Access Control (MAC) layer conversion method as the protocol conversion method for multimedia data;
      define a Transmission Control Protocol (TCP) layer conversion method or a User Datagram Protocol (UDP)/TCP layer conversion method as the protocol conversion method for real-time control data; and
      define an Internet Protocol (IP) layer conversion method as the protocol conversion method for diagnostic communication data.

* * * * *